United States Patent
Husain et al.

(10) Patent No.: US 8,810,188 B2
(45) Date of Patent: Aug. 19, 2014

(54) POSITION ESTIMATION AT STARTING AND LOWER SPEEDS IN THREE-PHASE SWITCHED RELUCTANCE MACHINES

(76) Inventors: Iqbal Husain, Copley, OH (US); Gregory Pasquesoone, Akron, OH (US)

(*) Notice: Subject to any disclaimer, the term of this patent is extended or adjusted under 35 U.S.C. 154(b) by 476 days.

(21) Appl. No.: 12/614,732

(22) Filed: Nov. 9, 2009

(65) Prior Publication Data

US 2010/0277113 A1 Nov. 4, 2010

Related U.S. Application Data (60) Provisional application No. 61/174,388, filed on Apr. 30, 2009.

(51) Int. Cl.
*H02P 1/46* (2006.01)
(52) U.S. Cl.
USPC .......................... 318/701; 318/434; 318/445
(58) Field of Classification Search
USPC ............ 318/701, 434, 445, 449, 700, 400.12, 318/400.15, 400.02, 400.33, 400.01
See application file for complete search history.

(56) References Cited

U.S. PATENT DOCUMENTS

| 5,859,518 A | 1/1999 | Vitunic |
| 6,011,368 A | 1/2000 | Kalpathi et al. |
| 7,605,515 B2 * | 10/2009 | Koehler ........................ 310/207 |

FOREIGN PATENT DOCUMENTS

| EP | 1139560 | 10/2001 |
| EP | 1530283 | 5/2005 |
| GB | 2329770 | 3/1999 |

* cited by examiner

*Primary Examiner* — Karen Masih
(74) *Attorney, Agent, or Firm* — Renner Kenner Greive Bobak Taylor & Weber (57) ABSTRACT

Provided is a method of indirect position estimation in three-phase switched reluctance machines. The method may comprise providing a three-phase switched reluctance machine. A three-phase switched reluctance machine may comprise a rotor and three phases. The method may further comprise producing data about the machine, setting threshold current values for at least a first phase; and sensing rotor position. Sensing rotor position may comprise applying a sensing pulse voltage sufficient to induce a pulse current having some maximum amperage in the first phase, determining the amplitude of the maximum amperage of said pulse current with respect to the thresholds for the first phase, and determining the sector of the rotor based upon the amplitude of the maximum amperage of the pulse current in the first phase.

14 Claims, 5 Drawing Sheets

POSITION ESTIMATION AT STARTING AND LOWER SPEEDS IN THREE-PHASE SWITCHED RELUCTANCE MACHINES

This application claims priority to U.S. Ser. No. 61/174,388, titled POSITION ESTIMATION AT STARTING AND LOWER SPEEDS IN THREE-PHASE SWITCHED RELUCTANCE MACHINES, filed Apr. 30, 2009, which is incorporated herein by reference.

TECHNICAL FIELD

Provided is a method of sensing the rotor position of a switched reluctance motor (SRM). More particularly, provided is a method of sensing the rotor position of a three-phase SRM by pulse injection.

BACKGROUND

An SRM may have three phases, four phases, or some other number of phases. In some applications, it may be desirable to detect the rotor position in an SRM. In some applications, scheduling the commutation angles in an SRM is a function of rotor position.

Rotor position detection may be direct or indirect. Direct position sensing of a rotor may be done with a position sensor. Indirect position sensing or position estimation of a rotor may be done without a position sensor.

Position sensors may include shaft-mounted encoders or resolvers. A position sensor may sense rotary position based on optical detection, magnetic field variations, or other methodologies. Position sensors may include potentiometers, resolvers, synchros, encoders, and the like, as well as combinations thereof.

Indirect position sensing of a rotor done without a position sensor may be by intrusive methods or non-intrusive methods.

In some embodiments, the intrusive methods involve active probing of the idle phases of an SRM. In some embodiments, the inductances of the SRM phases may be measured by probing signals. In some embodiments, the assumptions and methodology employed in intrusive methods limit applicability at high speeds.

In some embodiments, the non-intrusive methods employ terminal measurements of the phase current and phase voltage of the SRM. In some embodiments, the methodology and assumptions used in this method limits the performance at low, zero, or near zero speeds.

It remains desirable to develop methods of indirect position sensing of the rotor position of a three-phase SRM adequate to address a broad scheme of operational scenarios, including, but not limited to low speeds and high speeds.

SUMMARY

Provided is a method of indirect position estimation in three-phase switched reluctance machines. The method may comprise providing a three-phase switched reluctance machine. A three-phase switched reluctance machine may comprise a rotor and three phases. The method may further comprise producing data about the machine, setting a plurality of threshold current values for at least a first phase, and sensing rotor position. Sensing rotor position may comprise applying a pulse voltage train sufficient to induce a pulse current in said first phase, wherein the induced pulse current has some maximum amperage amplitude, comparing the maximum amperage amplitude to at least one of the plurality of threshold current values for the first phase, and determining the sector of the rotor based upon the maximum amperage amplitude of the pulse current in the first phase.

Also provided is a method of indirect position estimation in three-phase switched reluctance machines. The method may comprise providing a three-phase switched reluctance machine. A three-phase switched reluctance machine may comprise a rotor and three phases. The method may further comprise producing data about the machine. Producing data about the machine may comprise, for each of the three phases, conducting a first testing event at a first angular position while said rotor is in motion, and conducting a second testing event at a second angular position while said rotor is in motion. The first testing event may comprise applying a test pulse voltage across the phase to induce a current, determining the maximum induced current in the phase, and allowing the induced current to drop to zero. The second testing event may comprise applying a test pulse voltage across the phase to induce a current, and determining the maximum induced current. The method may further comprise setting threshold current values for each of the three phases. Setting threshold current values for each of the three phases may comprise setting a high current threshold for each of the three phases, and setting a low current threshold for each of the three phases. The method may further comprise sensing rotor position. Sensing rotor position may comprise applying a sensing voltage sufficient to induce a pulse current having some maximum amperage amplitude in each of the three phases, for each phase, comparing the maximum amperage amplitude of said pulse current with respect to the thresholds for the phase, and determining the sector of the rotor based upon the amplitude of the maximum amperage of the pulse current in at least one phase.

Also provided is an apparatus for indirect position estimation in three-phase switched reluctance machines wherein the three-phase switched reluctance machines comprise a rotor having a plurality of sectors and three phases. The apparatus may comprise a voltage source operatively engaged with a phase, a current sensing circuit operatively engaged with a phase, and a computer.

BRIEF DESCRIPTION OF THE DRAWINGS

The present subject matter may take form in certain parts and arrangement of parts, embodiments of which will be described in detail in this specification and illustrated in the accompanying drawings which form a part hereof, and wherein.

DETAILED DESCRIPTION

Reference will be made to the drawing, FIGS. 1-5, wherein the showings are only for purposes of illustrating certain embodiments of a method of position estimation at starting and lower speeds in three-phase switched reluctance machines, and not for purposes of limiting the same. Specific characteristics relating to the embodiments disclosed herein are not to be considered as limiting, unless the claims expressly state otherwise.

In certain embodiments, sensorless operation of a three phase SRM may use one phase for motoring and one or more other phases to sense the position at different instants of time. In certain embodiments, pulse injection may be able to sense the position of the rotor at starting. In certain embodiments, a pulse is injected into the three phases at the same time and those pulses are compared to identify the rotor position. The position of the SRM rotor can be identified in terms of sectors. For the three phase SRM, six different sectors may be defined. Each sector is unique and tells us which phase may be used for sensing and which phase may be used for motoring or powering the SRM.

Figure 1:
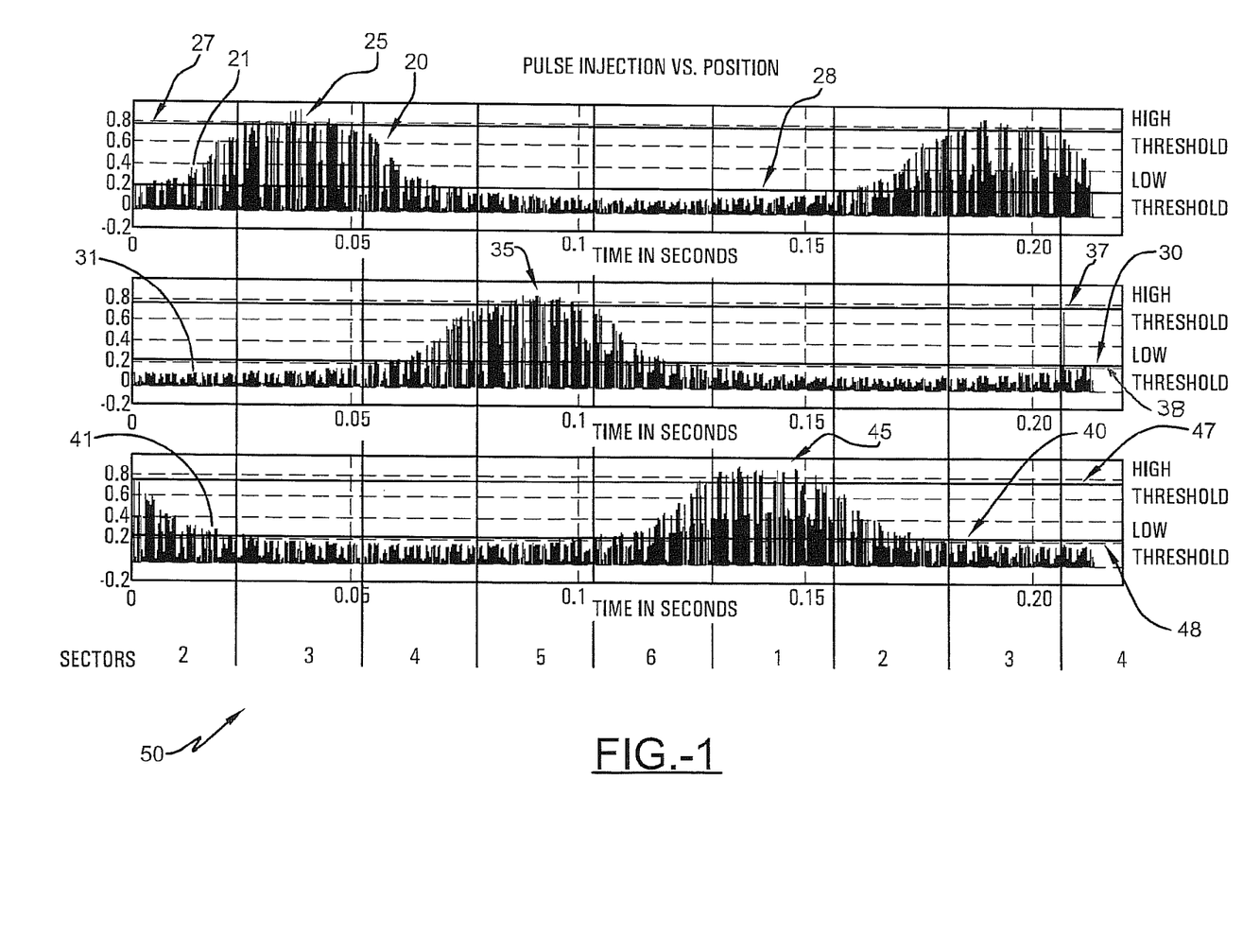
FIG. 1 is a set of graphs showing current pulses versus position in each of three phases.

FIG. 1 shows data from one non-limiting embodiment of a method of position estimation at starting and lower speeds in three-phase switched reluctance machines. Without limitation, the embodiment comprises a pulse injection. A pulse injection comprises the application of a pulse voltage across a phases of an SRM. Without limitation, in the embodiment from which the data shown in FIG. 1 was taken, the experiment comprised application of a pulse injection across each of the three phases of an SRM, phases A, B, and C, and the monitoring of the variations in the currents with respect to time in each of the three phases of an SRM. The pulse injection currents are used for position estimation and, in some embodiments, are not used for motoring or powering the SRM.

In the embodiment shown, a pulse voltage was applied across each of phases A, B, and C and the produced current in each of phases A, B, and C was measured. In general, during measurement of the current, the rotor may undergo a very small or zero angular displacement. Without limitation, in the embodiment shown, when the current produced in a phase vanished, a new angular position was established, another pulse voltage was applied across the phase in which the produced current had vanished, and another current thereby induced.

Each pulse voltage application, resultant production of current, and subsequent vanishing of the produced current may be referred to as a "testing event". In some embodiments a series of testing events are used. A plurality of repetitions of pulse voltage applications may be referred to as a "pulse voltage train". In some applications a plurality of pulse voltages are applied in a series forming a pulse voltage train continuing until at least one electrical cycle of the SRM is complete. In some applications a plurality of pulse voltages are applied in a series forming a pulse voltage train continuing over some fraction of a complete electrical cycle of the SRM.

In some embodiments in which a pulse voltage train is applied, the pulse voltage train in a given phase may be of fixed frequency. In some embodiments in which a pulse voltage train is applied to multiple phases, the frequency of the pulse voltage train may be the same or vary between phases.

In some embodiments, the pulse voltage applied to a given phase may be some fraction of the duty ratio for that phase. In some embodiments, the pulse voltage applied to a given phase may be less than 40% of the duty ratio for that phase.

In some embodiments, and without limitation, a zero angular displacement occurs during measurement. If subsequent measurements are to be taken, prior to taking any subsequent measurements, a new angular position may be established.

In some embodiments, and without limitation, the rotor undergoes an angular displacement during measurement and a new angular position may be established by taking measurements while the rotor is in motion. In some embodiments, and without limitation, the rotor undergoes a very small angular displacement during measurement. FIG. 1 shows, for phase A, a graph of current versus time 20, for phase B, a graph of current versus time 30, and, for phase C, a graph of current versus time 40. Each graph is composed of a series of current spikes, such as, without limitation, a spike 21 in phase A, a spike 31 in phase B, and a spike 41, in phase C. Each spike, 21, 31, 41 was produced by a pulse voltage application and each spike has a maximum. The plurality of spikes in each phase is the result of a pulse voltage train. The width of the spikes along the abscissa represents angular displacement during the period over which the current was induced. In some embodiments, the width of the spikes along the abscissa is variable. Without limitation, each spike shown in FIG. 1 has a fixed width along the abscissa.

Whether the angular displacement during the measurement of the current is very small or zero, the data regarding the current will be referred to herein as data taken at some angular position unless otherwise noted. The difference between data taken over a very small displacement such as, without limitation, that shown in FIG. 1, and that taken at a single discrete angular location may be made small enough to avoid the introduction of unacceptable error into the provided methods.

Viewed collectively, and on a macro scale, the graphs in the non-limiting embodiment depicted in FIGS. 1, 20, 30 and 40, are cyclical; the current spikes in each phase vary between a cyclical maximum and a cyclical minimum with a single maximum region, 25, 35, 45, for each cycle. The cyclical nature of each graph coincides with the cyclical nature of the rotation of the SRM; that is, the graphs show cycles with periods coinciding with the revolution of the SRM. The phases are angularly biased with respect to one another; that is, the phase B and phase C pulse injection current profiles are offset from phase A profile by 120° (electrical) and 240° (electrical), respectively.

The graphs, 20, 30, 40, shown in FIG. 1 describe more than a single electrical revolution of the SRM. The single electrical revolution is also termed as an electrical cycle. The graphs in FIG. 1 describe data over approximately 0.22 seconds. At the speed at which the SRM was rotating during the period shown, a single revolution took approximately, 0.16 seconds.

As will be detailed more fully, below, in some non-limiting embodiments, the period of a three-phase SRM cycle may be described as comprising six equal position sectors. In embodiments comprising six equal position sectors, each sector covers 60 electrical degrees and collectively cover all 360 electrical degrees of a full cycle. Position sector labels, 50 are shown in FIG. 1.

Figure 2:
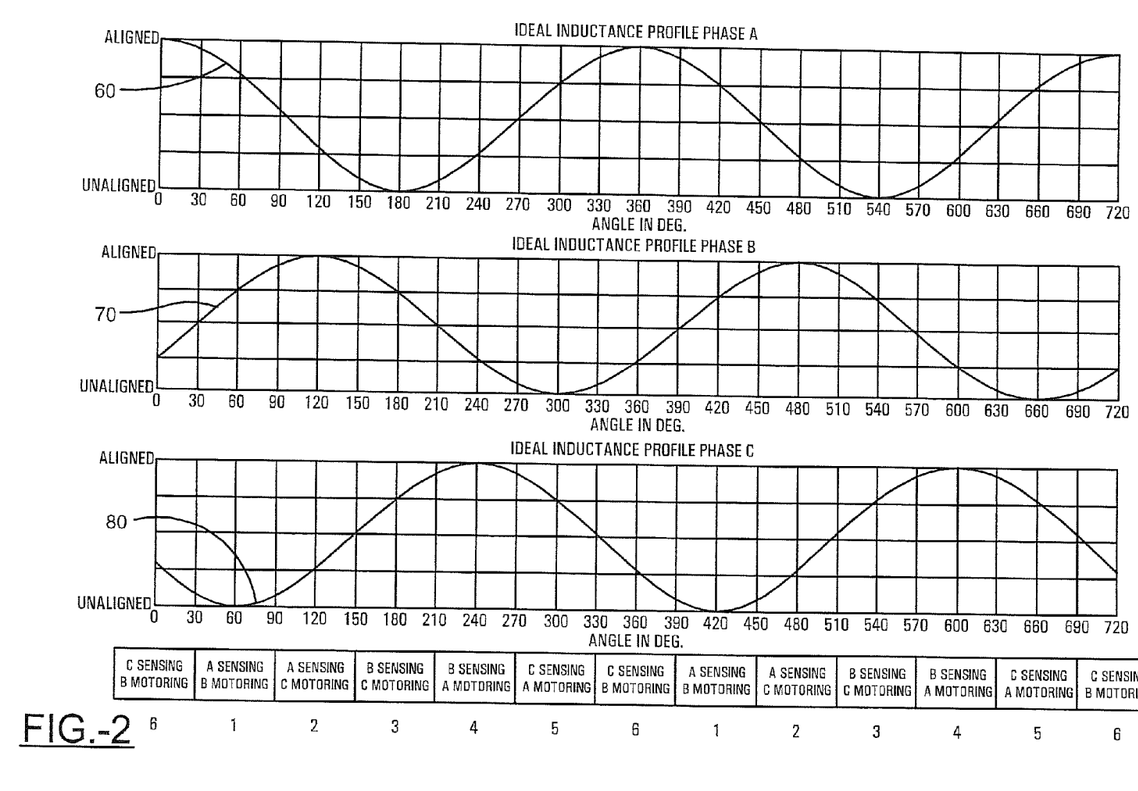
FIG. 2 is a set of graphs showing phase inductance versus position in each of three phases.

FIG. 2 shows data from one non-limiting embodiment of a method of position estimation at starting and lower speeds in three-phase switched reluctance machines. FIG. 2 shows the theoretical phase inductance variation as a function of the rotor position in electrical angles in three phases. The topmost graph in FIG. 2, 60, is a graph of inductance versus rotor position in phase A. The middle graph in FIG. 2, 70, is a graph of inductance versus rotor position in phase B. The bottommost graph in FIG. 2, 80, is a graph of inductance versus rotor position in phase C.

As shown in FIG. 2, phase inductance is inversely proportional to the pulse injection current amplitudes. Comparing the data shown in FIG. 2 with the data shown in FIG. 1, the phase inductance amplitude maximum in a given phase coincides with the pulse injection current amplitude minimum in that phase. Similarly, the phase inductance amplitude minimum in a given phase coincides with the pulse injection current amplitude maximum in that phase. For example, and without limitation, graph 60 shows that phase inductance amplitude in phase A is minimum at an electrical angle range of 150 to 210 degrees. By comparison with graph 20, it can be seen that the electrical angle range of 150 to 210 degrees corresponds to sector 3, and that the pulse injection current amplitude in phase A is at its maximum in sector 3.

A pulse injection current profile for a given phase for a given model of SRM may be measured using a testing pulse voltage train to establish a signature description of the angular position of a given model and phase and used to estimate position. The pulse injection current profiles for a given phase for a given model of SRM, once known, can be used as a reliable estimator of angular position. For example, referring to FIG. 1, graph 20, the known pulse injection current profile of phase A can be used to show that, if a test pulse voltage similar to the testing pulse voltage is applied to phase A and produces a current of more than the non-limiting high threshold then the SRM is in the third sector. As shown in the non-limiting embodiment depicted in FIG. 1, the high threshold is approximately 0.8 A.

In certain non-limiting embodiments, during operation of a three phase SRM, phases may be used for motoring or sensing. A phase used for motoring, a motoring phase, applies a substantial voltage in order to the move the rotor. A phase used for sensing, a sensing phase, applies a pulse voltage in order to induce a measureable pulse injection current. Without limitation, the average voltage needed to induce a measureable pulse injection current may be substantially less than the average voltage needed to the move the rotor.

In certain non-limiting embodiments, during operation of a three phase SRM, at any given time, one phase will perform the duty of a motoring phase and one phase will perform the duty of a sensing phase. As the rotor position changes, the available three phases, A, B, and C, of the SRM switch between performing duty as a motoring phase, being idle, and performing duty as a sensing phase. This switching of the duties, motoring, idle, and sensing, among the SRM phases is commutation.

In certain embodiments, an algorithm using the relative variation of the three pulse injection currents in three phases is used to determine the rotor position sectors from the three pulse injection currents in the three phases. The sector information is used for starting and continuing operation of an SRM. In certain embodiments, sector information is used for commutation; to determine which phase will be motoring and which phase will be sensing at a given time and to determine when it is appropriate to transition between performing duty as a motoring phase, being idle, and performing duty as a sensing phase amongst phases A, B, and C. In certain embodiments, sector information is used to determine how to apply power to the appropriate phases of the SRM to control torque and speed of the SRM.

In certain embodiments, in order to determine the different sectors, two thresholds for each phase are established. In each phase, the two thresholds comprise a high threshold and low threshold. As shown in the non-limiting embodiment depicted in FIG. 1, in phase A, as shown in graph 20, the high threshold 27 is approximately 0.8 A and the low threshold 28 is approximately 0.2 A. In phase B, as shown in graph 30, the high threshold 37 is approximately 0.8 A and the low threshold 38 is approximately 0.2 A. In phase C, as shown in graph 40, the high threshold 47 is approximately 0.8 A and the low threshold 48 is approximately 0.2 A. In certain embodiments, the high threshold is the same in each phase. In certain embodiments, the low threshold is the same in each phase. In certain embodiments, the thresholds may be different among the various phases.

The high threshold and low threshold are selectable values. In certain embodiments, the high threshold and low threshold may be selected as a function of speed to provide the desired torque of the SRM.

In certain embodiments, the high threshold is set at or near the maximum amperage of the current pulse response that is 30 degrees (electrical) away from the unaligned position. In the non-limiting embodiment shown in FIG. 1, the high threshold for phase A is at the end of sector 3; this corresponds to the position of the theoretical inductance profile at 210 degrees as shown in curve 60 of FIG. 2. The low threshold is set at the maximum amperage of the current pulse response measured between the unaligned and aligned inductance positions of the theoretical inductance profile. In the non-limiting embodiment shown in FIG. 1, the low threshold for phase A is at the end of sector 4; this corresponds to the position of the theoretical inductance profile at 270 degrees as shown in curve 60 of FIG. 2. The thresholds are set after the data collection of a three phase SRM. The two thresholds determined from SRM data may be used at zero and very low speeds. As speed increases, the thresholds may be slightly advanced linearly as a function of speed to two fixed upper maximum values.

The determination of when to switch the three phases, A, B, and C, between the various duties and idle status is relevant to operation of a three phase SRM. The different thresholds can be used to determine the SRM sector and thereby how to switch the three phases, A, B, and C, between the various duties and idle status. In some embodiments, a low threshold may be used to determine when to change the phase performing the duty of motoring. In some embodiments, a high threshold may be used to determine when to change the phase performing the duty of sensing.

In certain embodiments, a starting initial algorithm for the sensorless operation is able to run the machine from any initial condition. Without limitation, a power converter adapted to apply a pulse voltage to a phase may be used to inject a current pulse simultaneously on the three phases of the SRM. The rotor position may be found by comparison of the resulting maximum pulse amplitudes in each phase, Ia, Ib, and Ic in each of phase A, B, and C, respectively, with the high and low thresholds. TABLE 1 summarizes one embodiment of a comparison algorithm.

TABLE 1

Sector determination as a function of the pulse amplitudes

| Sector | Phase A pulse amplitude | Phase B pulse amplitude | Phase C pulse amplitude |
|---|---|---|---|
| 1 | Ia < Low Threshold | Ib < Low Threshold | Ic > High Threshold |
| 2 | Low Threshold < Ia < High Threshold | Ib < Low Threshold | Low Threshold < Ic < High Threshold |
| 3 | Ia > High Threshold | Ib < Low Threshold | Ic < Low Threshold |
| 4 | Low Threshold < Ia < High Threshold | Low Threshold < Ib < High Threshold | Ic < Low Threshold |

TABLE 1-continued

Sector determination as a function of the pulse amplitudes

| Sector | Phase A pulse amplitude | Phase B pulse amplitude | Phase C pulse amplitude |
|---|---|---|---|
| 5 | Ia < Low Threshold | Ib > High Threshold | Ic < Low Threshold |
| 6 | Ia < Low Threshold | Low Threshold < Ib < High Threshold | Low Threshold < Ic < High Threshold |

TABLE 1 shows how the maximum amperage of each of said pulse currents in each phase may be compared to both of the thresholds in the respective phases to determine the relationship of the maximum pulse amplitudes with respect to the thresholds. The maximum amperage of pulse currents with respect to the thresholds for the phase may be 1) BELOW; that is, below the low threshold, 2) ABOVE; that is, above the high threshold, or 3) BETWEEN; that is, between the low threshold and the high threshold. As shown in TABLE 1, the pulse amplitudes in one or more phases may be used to determine the sector of the SRM.

For example, and without limitation, if the pulse amplitude of the phase A is BETWEEN, higher than the Low Threshold of phase A and lower than the high threshold of phase A, and at the same time the pulse amplitude on one of the other phases is BELOW, lower than the Low Threshold of that phase, then a unique sector is identified as the correct sector.

For example and without limitation, referring to TABLE 1, if the maximum amperage of the pulse current in phase A is BETWEEN, and the maximum amperage of the pulse current in phase B is BELOW, then the sector of the SRM is 2.

In some situations, a determination of the sector may be made with data about the maximum amperage amplitude of only two phases. In some situations, a determination of the sector may be made with data about the maximum amperage amplitude of only one phase. For example, and without limitation, referring to TABLE 1, if the maximum amperage amplitude in phase A is ABOVE, then the sector of the SRM is 3.

In order to operate a three phase SRM, it may be desirable to find the position or angle of commutation of the phases. At some performance levels, such as, without limitation, a medium performance drive system, the absolute position is not necessary at each instant of time. In some medium performance drive systems, the positions for commutation may be necessary. In some medium performance drive systems, sufficient resolution in expressing positions for commutation is provided by defining the sector. Positions for commutation may be determined as a function of the position sector of the SRM as shown in TABLE 2 below.

FIG. 1 shows a three phase SRM with six sectors defined. The two thresholds are used to change phases for 1) powering currents, that is, motoring, and 2) for position sensing pulse injection currents, that is, sensing.

The low threshold level is the phase commutation point where the active phase for producing torque and powering the machine, motoring, is changed. The pulse injection current for position estimation, sensing, is continued in the same phase beyond the low threshold.

The high threshold level is the phase commutation point where the active phase for pulse injection current, sensing, is changed. The phase for producing torque and powering the machine, motoring, is continued in the same phase beyond the high threshold.

In certain embodiments, the described two threshold level comparison and the associated algorithm provide acceptably high resolution of position estimation with pulse injection in a three-phase SRM. In some embodiments, the motoring phase currents may be repositioned by shifting or advancing one or more thresholds as the SRM speed increases. In some embodiments the threshold repositioned as the SRM speed increases may be both the high and low thresholds or only the low threshold. The nature of phase advance can be modified very easily by shifting the thresholds together or independently. The low threshold controls the turn-ON and turn-OFF angle of the motoring phase. The high threshold may also be simultaneously advanced to maintain the pulse injection in the middle of the non motoring period. In certain embodiments, two phases may be motoring simultaneously for a brief overlap period during commutation from one phase to another. To accommodate phase overlap operation, a third threshold may be introduced in between the high and low thresholds. The level of this threshold depends on the degree of overlap required to produce the desired SRM torque.

A summary of the phase used for powering/motoring and for position sensing as functions of the sector and of the rotor position is given TABLE 2.

TABLE 2

Phase used for sensing and motoring vs. sector

| Sector | Angle position | Phase used for sensing | Phase used for motoring |
|---|---|---|---|
| 1 | 30-90 | A | B |
| 2 | 90-150 | A | C |
| 3 | 150-210 | B | C |
| 4 | 210-270 | B | A |
| 5 | 270-330 | C | A |
| 6 | 0-30 & 330-360 | C | B |

Figure 3:
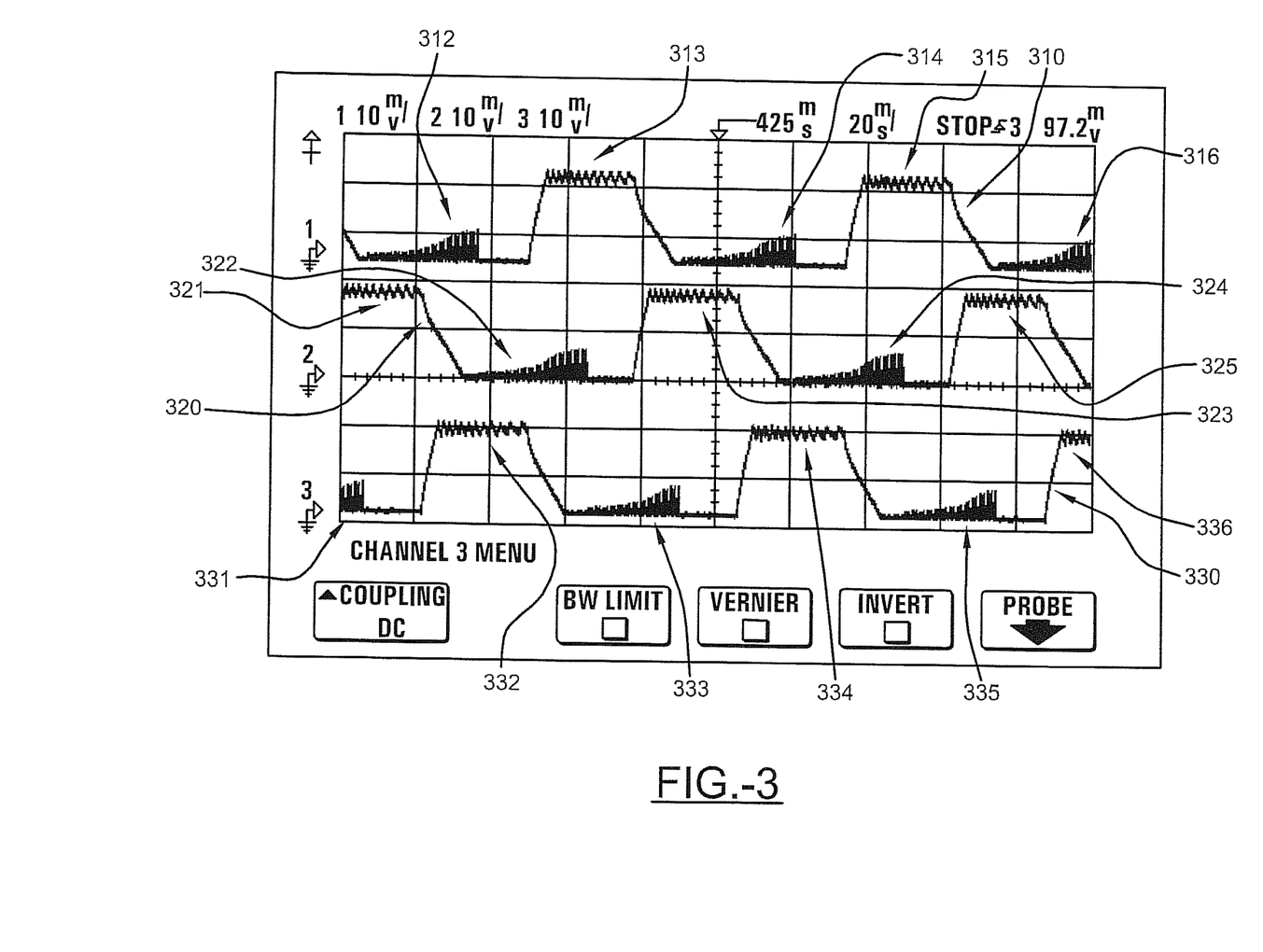
FIG. 3 is a set of graphs showing current versus time in each of three phases.

FIG. 3 shows, without limitation, results from one experiment regarding a sensorless method of position estimation at lower speeds in three-phase switched reluctance machines. FIG. 3 clearly shows the current in each phase as the phases switch between use for sensing, idling, and powering. The graphs in FIG. 3 show current in three phases over the course of multiple cycles.

Graph 310 of FIG. 3 shows the current in phase A. Graph 310 comprises a series of identifiable regions. These identifiable regions comprise sensing current regions 312, 314, and 316 showing a relatively low current indicative of usage as a sensing phase. These identifiable regions also comprise motoring current regions 313, and 315 showing a relatively high current indicative of usage as a motoring phase.

Graph 320 of FIG. 3 shows the current in phase B. Graph 320 comprises a series of identifiable regions. These identifiable regions comprise sensing current regions 322 and 324 showing a relatively low current indicative of usage as a sensing phase. These identifiable regions also comprise motoring current regions 321, 323, and 325 showing a relatively high current indicative of usage as a motoring phase.

Graph 330 of FIG. 3 shows the current in phase C. Graph 330 comprises a series of identifiable regions. These identifiable regions comprise sensing current regions 331, 333, and 335 showing a relatively low current indicative of usage as a sensing phase. These identifiable regions also comprise motoring current regions 332, 334, and 336 showing a relatively high current indicative of usage as a motoring phase.

Without limitation, the provided method, allows simple implementation by accounting for variations in the DC link bus voltage. A set of constant coefficients can be found to relate the DC bus voltage to the threshold values.

Figure 4:
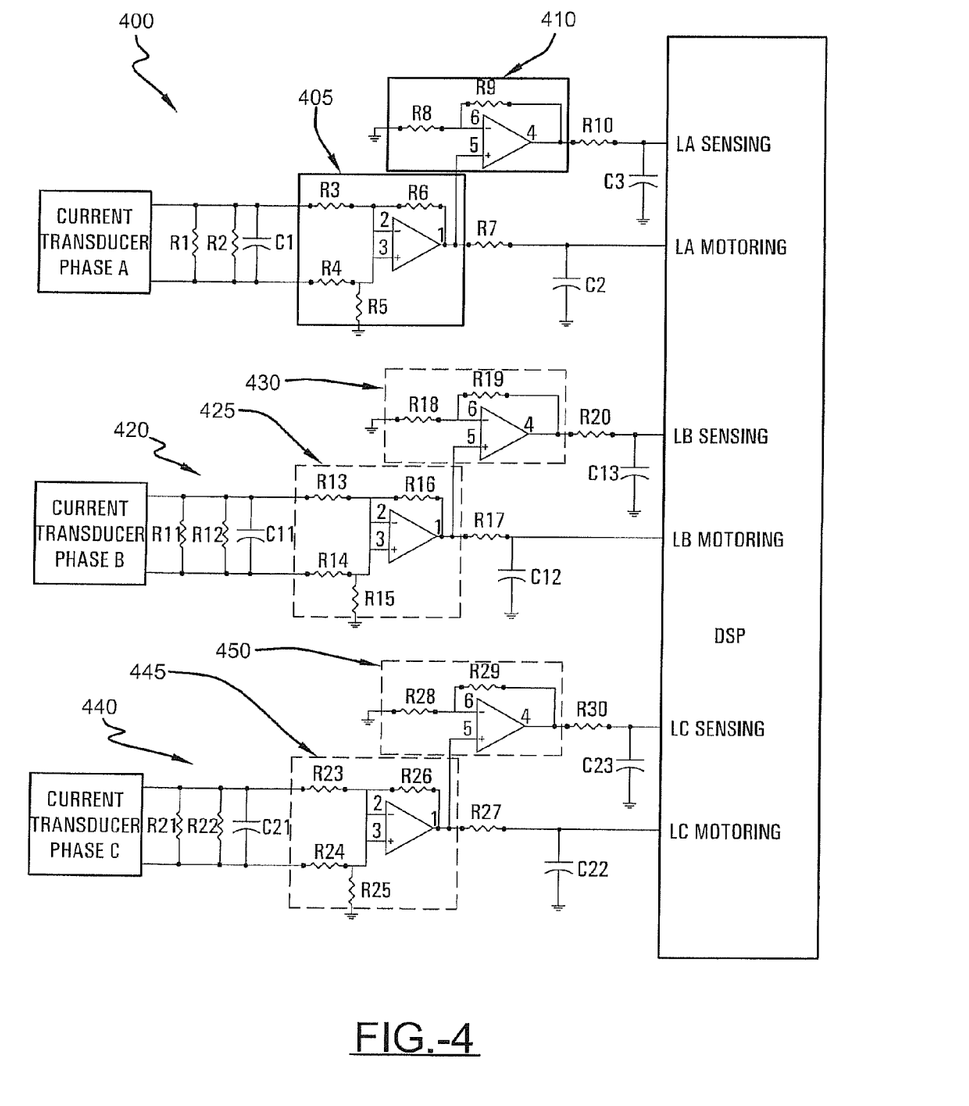
FIG. 4 is a diagram of one embodiment of circuit useful for practicing a method for sensing the rotor position of a three-phase SRM.

FIG. 4 shows, without limitation, an embodiment which provides three circuits which may be used to separate sensing current pulses from motoring phase currents in the starting and control of an SRM using a sensorless method. In the non-limiting embodiment shown in FIG. 4, circuit 400 is operatively engaged to measure current in phase A, circuit 420 is operatively engaged to measure current in phase B, and circuit 440 is operatively engaged to measure current in phase C.

In the non-limiting embodiment shown in FIG. 4, current sensing circuit 400 comprises an amplifier 405 for processing the motoring phase currents and an amplifier 410 for processing the sensing pulse currents; current sensing circuit 420 comprises an amplifier 425 for processing the motoring phase currents and an amplifier 430 for processing the sensing pulse currents; and current sensing circuit 440 comprises an amplifier 445 for processing the motoring phase currents and an amplifier 450 for processing the sensing pulse currents.

In the non-limiting embodiment shown in FIG. 4, a single current sensor or transducer measure both the sensing current and motoring current and delivers the current measurement to an electronic circuit 400, 420, 440 for the separation of the sensing pulse currents and the motoring phase currents. In certain embodiments, the sensing pulse currents may be of substantially smaller amperage than the motoring phase currents. In embodiments in which the sensing pulse currents are of substantially smaller amperage than the motoring phase currents, the gain of the amplifier 410, 430, 450 processing the sensing pulse currents may be larger than the gain of the amplifier 405, 425, 445 processing the motoring phase currents. Without limitation, in some embodiments the gain of the amplifier 410, 430, 450 may be ten or more times larger than the gain of the amplifier 405, 425, 445. The sensing pulse current and the motor phase current may be processed and/or separated by the two amplifiers in the electronic circuit. Data or a signal representative of the sensing pulse current or the motor phase current, or both may be output from the circuit. The output signal or data from the circuit may be sent to a digital signal processor or microcontroller for implementing the position estimation algorithm as well as the SRM torque and speed control algorithm.

As noted above, in some embodiments, in order to determine the rotor position a comparison is done between the maximum pulse amplitude, in one or more phases with the high and low thresholds of those one or more phases. In some embodiments, the comparison of the maximum pulse amplitude, in one or more phases with the high and low thresholds of those one or more phases is done with equipment selected from the group consisting of interface electronics, sensors and sensor feedback signals, and a computer. Without limitation, in some embodiments, the comparison of the maximum pulse amplitude, in one or more phases with the high and low thresholds of those one or more phases is done with interface electronics, sensors and sensor feedback signals, and a computer.

As used herein, unless otherwise indicated, a computer may comprise an electronic computer, an electromechanical computer, or a mechanical computer. An electronic computer may comprise any electronic digital computer, digital signal processor (DSP), or computing platform environment. Electromechanical computers may comprise, without limitation, a relay ladder logic system. In certain embodiments, and without limitation the computing platform may comprise the DSP shown in FIG. 4. In certain embodiments, and without limitation the computing platform may comprise the computing platform shown in FIG. 5.

Figure 5:
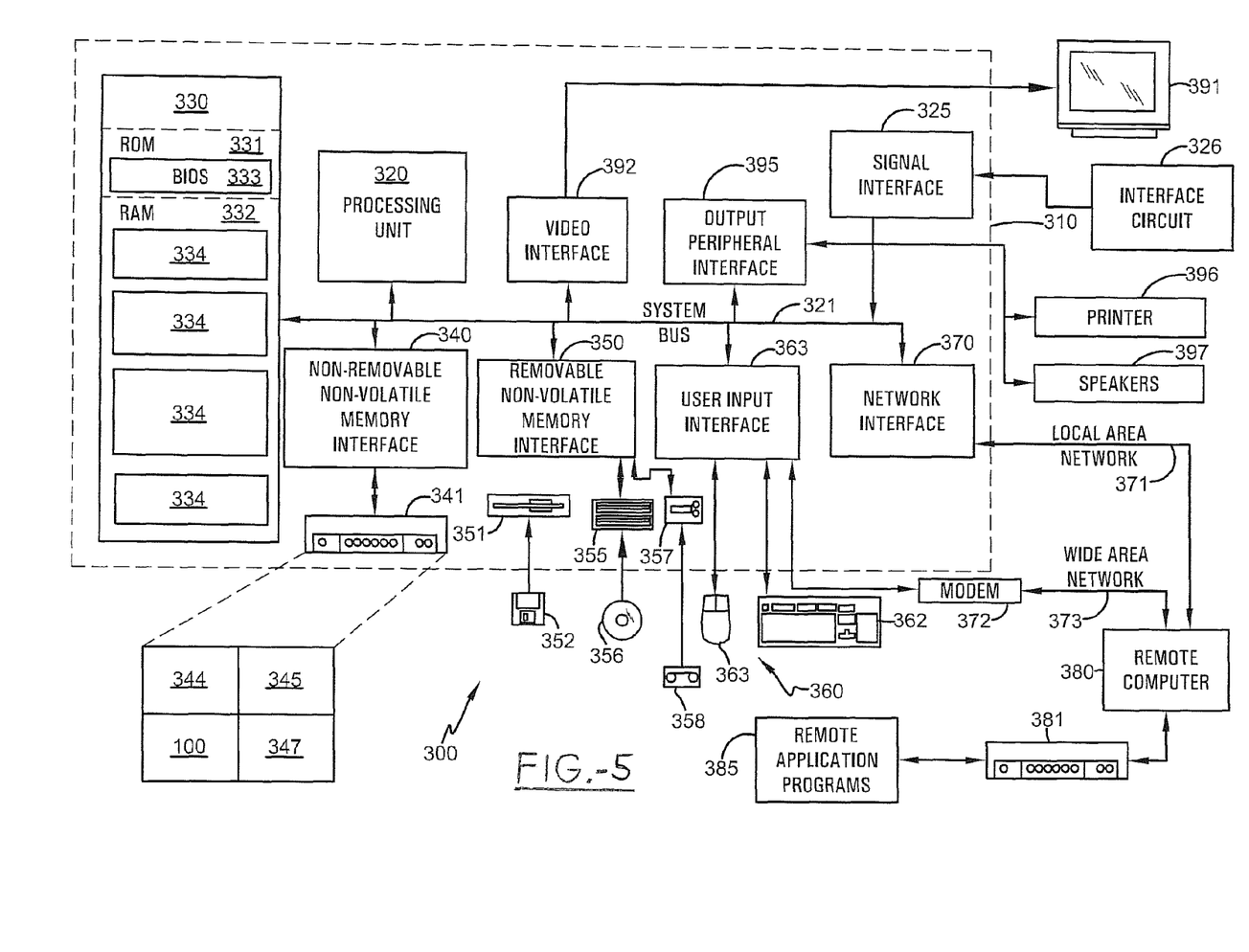
FIG. 5 is a diagram of one embodiment of computing platform useful for practicing a method for sensing the rotor position of a three-phase SRM.

With reference now to FIG. 5, an example of a suitable computing platform environment 300 for implementing the method of position estimation at starting and lower speeds in three-phase switched reluctance machines according to one embodiment is illustrated. The computing platform environment 300 is only one non-limiting example of a suitable computing platform environment and is not intended to suggest any limitation as to the scope of use or functionality of the method of position estimation at starting and lower speeds in three-phase switched reluctance machines. Neither should the computing platform environment 300 be interpreted as having any dependency or requirement relating to any one or combination of components illustrated in the exemplary operating computing platform environment 300. The method of position estimation at starting and lower speeds in three-phase switched reluctance machines may be performed with numerous other general purpose or special purpose computing platform environments or configurations. Examples of well known computing platforms, environments, and/or configurations that may be suitable for use with the method of position estimation at starting and lower speeds in three-phase switched reluctance machine include, but are not limited to, personal computers, server computers, hand-held or laptop devices, multiprocessor systems, microprocessor-based systems, program logic controllers (PLC), remote terminal units (RTU), data concentrators, system control and data acquisition (SCADA) devices, programmable consumer electronics, network PCs, minicomputers, mainframe computers, distributed computing environments that include any of the above systems or devices, and the like. The method of position estimation at starting and lower speeds in three-phase switched reluctance machines may comprise computer-executable instructions, such as program modules, being executed by a computer. Generally, program modules include routines, programs, objects, components, data structures, etc. that perform particular tasks or implement particular abstract data types. The method of position estimation at starting and lower speeds in three-phase switched reluctance machines may also be practiced using distributed computing platform environments where tasks are performed by remote processing devices that are linked through a communications network or other data transmission medium. In a distributed computing platform environment, program modules and other data may be located in both local and remote computer storage media including memory storage devices.

With continued reference to FIG. 5, according to one embodiment, a system for implementing the method of position estimation at starting and lower speeds in three-phase switched reluctance machines may comprise a general purpose computing system or platform in the form of a computing platform 310. The computing platform 310 may include a plurality of computer system components including, but not limited to, a processing unit 320, a memory portion 330, and a system bus 321. The system bus 321 may couple various system components including the memory portion 330 to the processing unit 320. The system bus 321 may be any of several types of bus structures including a memory bus or memory controller, a peripheral bus, and a local bus using any of a variety of bus architectures chosen with sound judgment by a person of ordinary skill.

With continued reference to FIG. 5, the computing platform 310 may comprise a signal interface 325. A signal interface 325 may comprise an analog-to-digital (A/D) converter and a digital input/output. A signal interface 325 may be operably engaged to an interface circuit 326. An interface circuit 326 may comprise a sensor circuit, a fault and protection circuit and a gate driver signal conditioning circuit.

With continued reference to FIG. 5, the computing platform 310 may include a plurality of computer readable media. The computer readable media can be any available media that can be accessed by the computing platform 310 and includes both volatile and nonvolatile media, removable and non-removable media. By way of example, and not limitation, the computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by the computing platform 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The computing platform 310 may comprise any of the computer readable media or any combination of computer readable chosen with sound judgment by a person of ordinary skill in the art.

With continued reference to FIG. 5, the memory portion 330 may include computer storage media in the form of volatile and/or nonvolatile memory such as read only memory (ROM) 331 and random access memory (RAM) 332. The computing platform 310 may comprise a basic input/output system 333 (BIOS). The BIOS 333 may contain the basic routines that at least partially enable the transfer of information between the plurality of system components within the computing platform 310. The BIOS 333 may be stored in the ROM 331. The RAM 332 may contain data and/or program modules 334 that are immediately accessible to and/or presently being operated on by the processing unit 320. Additionally, the computing platform 310 may also include other removable/non-removable, volatile/nonvolatile computer storage media. The computing platform 310 may comprise a hard disk drive 340, a magnetic disk drive 351, a nonvolatile magnetic disk drive 352, an optical disk drive 355, and/or a sequential media drive 357. The hard disk drive 340 may read from or write to a non-removable, nonvolatile magnetic media. The magnetic disk drive 351 may read from or write to a removable, nonvolatile magnetic disk 352. The optical disk drive 355 may read from or write to a removable, nonvolatile optical disk 356, such as a CD ROM or other optical media. The sequential media drive 357 may read from or write to a removable, nonvolatile sequential medium 358, such as a magnetic tape cassette or reel-to-reel tape. Other removable/non-removable, volatile/nonvolatile computer storage media that can be used may include, but are not limited to, flash memory cards, digital versatile disks, digital video tape, solid state RAM, solid state ROM, and any other type of computer storage media chosen with sound judgment by a person of ordinary skill in the art. The hard disk drive 341 may be connected to the system bus 321 through a non-removable memory interface such as interface 340. The magnetic disk drive 351 and the optical disk drive 355 may be connected to the system bus 321 by a removable memory interface, such as interface 350.

With continued reference to FIG. 5, the drives and their associated computer storage media discussed above may provide storage of computer readable instructions, data structures, program modules and other data for the computing platform 310. In one embodiment, the hard disk drive 341 may be used to store an operating system 344, application programs 345, the automated reconfiguration system 100, as well as other data 347. The computing platform 310 may comprise a plurality of input devices 360 that allow a user to enter commands and information into the computing platform 310. The plurality of input devices 360 may include input devices such as a keyboard 362 and a pointing device 361 (commonly referred to as a mouse, trackball or touch pad) or any other input device chosen with sound judgment by a person of ordinary skill in the art. The plurality of input devices 360 may be connected to the processing unit 320 through a user input interface 363. The user input interface 363 may be coupled to the system bus 321. The computing platform 310 may comprise a plurality of output devices 390. The plurality of output devices 390 may include a display device 391, an audio speaker system 397, and a printer device 396. The display device 391 may be connected to the system bus 321 via a video interface 392. The audio speaker system 397 and the printer device 396 may be connected to the system bus 321 via an output peripheral interface 395.

With continued reference to FIG. 5, the computing platform 310 may operate in a networked environment using logical connections to one or more remote computing platforms, such as a remote computing platform 380. The remote computing platform 380 may be a personal computer, a server, a router, a network PC, a peer device or other common network node. The remote computing platform 380 may include many or all of the components described above relative to the computing platform 310. The logical connections to the remote computing platform 380 may include a remote memory storage device 381, a local area network (LAN) 371 and a wide area network (WAN) 373. The logical connections to the remote computing platform 380 may include any other network or logical connection chosen with sound judgment by a person of ordinary skill in the art. When used in a LAN networking environment, the computing platform 310 may be connected to the LAN 371 through a network interface or adapter 370. When used in a WAN networking environment, the computing platform 310 may include a modem device 372 or other means for establishing communications over the WAN 373, such as the Internet, chosen with sound judgment by a person of ordinary skill in the art. The modem device 372, may be and internal or external modem device and may be connected to the system bus 321 via the user input interface 363. In a networked environment, program modules used for operating the automated reconfiguration system 100, or portions thereof, may be stored in the remote memory storage device 381. Additionally, remote application programs 385 for enabling the remote operation or execution of the automated reconfiguration system 100 may be stored on the remote memory storage device 381.

While the method of position estimation at starting and lower speeds in three-phase switched reluctance machines has been described above in connection with the certain embodiments, it is to be understood that other embodiments may be used or modifications and additions may be made to the described embodiments for performing the same function of the method of position estimation at starting and lower speeds in three-phase switched reluctance machines without deviating therefrom. Further, the method of position estimation at starting and lower speeds in three-phase switched reluctance machines may include embodiments disclosed but not described in exacting detail. Further, all embodiments disclosed are not necessarily in the alternative, as various embodiments may be combined to provide the desired characteristics. Variations can be made by one having ordinary skill in the art without departing from the spirit and scope of the method of position estimation at starting and lower speeds in three-phase switched reluctance machines. Therefore, the method of position estimation at starting and lower speeds in three-phase switched reluctance machines should not be limited to any single embodiment, but rather construed in breadth and scope in accordance with the recitation of the attached claims.

What is claimed is:

1. A method of indirect position estimation in three-phase switched reluctance machines comprising:
   providing a three-phase switched reluctance machine, said machine comprising a rotor and three phases; producing data about the machine;
   setting a plurality of threshold current values for at least a first phase; and sensing rotor position by;
   applying a pulse voltage train sufficient to induce a pulse current in said first phase, said pulse current having some maximum amperage amplitude, comparing the maximum amperage amplitude of said pulse current to at least one of the plurality of threshold current values for the first phase, and determining the sector of the rotor based upon the maximum amperage amplitude of the pulse current in the first phase.

2. The method of claim 1, wherein said setting a plurality of threshold current values for at least a first phase comprises, setting a high current threshold and a low current threshold for any of the three phases.

3. The method of claim 2, wherein said setting a plurality of threshold current values for at least a first phase comprises,
   setting a high current threshold for each of the three phases; and
   setting a low current threshold for each of the three phases.

4. The method of claim 3, wherein said producing comprises, determining a maximum induced current at a plurality of angular positions in at least a first phase.

5. The method of claim 4, wherein said producing comprises, determining a maximum current at a plurality of angular positions in each of at least a first phase and a second phase.

6. The method of claim 5, wherein said producing comprises, determining a maximum current at a plurality of angular positions in each of the three phases.

7. The method of claim 6, wherein said producing comprises, for each of the three phases,
   conducting a first testing event at a first angular position, said first testing event comprising:
   applying a test pulse voltage across the phase to induce a current, and
   determining the maximum induced current in the phase, and allowing said induced current to drop to zero.

8. The method of claim 7, further comprising, for each of the three phases, conducting a second testing event at a second angular position, said second testing event comprising:
   applying a test pulse voltage across the phase to induce a current, and
   determining the maximum induced current in the phase.

9. The method of claim 8, wherein said rotor is in motion during said testing event.

10. A method of indirect position estimation in three-phase switched reluctance machines comprising:
    providing a three-phase switched reluctance machine, said machine comprising a rotor and three phases;
    producing data about the machine, wherein said producing comprises, for each of the three phases;
    conducting a first testing event at a first angular position while said rotor is in motion, said first testing event comprising,
    applying a test pulse voltage across the phase to induce a current,
    determining the maximum induced current in the phase, and
    allowing said induced current to drop to zero; and
    conducting a second testing event at a second angular position while said rotor is in motion, said second testing event comprising,
    applying a test pulse voltage across the phase to induce a current, and
    determining the maximum induced current;
    setting threshold current values for each of the three phases, wherein said setting comprises,
    setting a high current threshold for each of the three phases;
    setting a low current threshold for each of the three phases; and sensing rotor position by;
    applying a sensing voltage sufficient to induce a pulse current having some maximum amperage amplitude in each of the three phases, for each phase, comparing the maximum amperage amplitude of said pulse current with respect to the thresholds for the phase, determining the sector of the rotor based upon the maximum amperage amplitude of the pulse current in at least one phase.

11. An apparatus for indirect position estimation in three-phase switched reluctance machines, where said three-phase switched reluctance machines comprise a rotor having a plurality of sectors and three phases, said apparatus comprising:
    a voltage source operatively engaged with a phase and adapted to apply a pulse voltage to said phase sufficient to induce a pulse current having some maximum amperage amplitude in said phase;
    a current sensing circuit operatively engaged with a phase to output data or a signal representative of the sensing current in said phase, said current sensing circuit being adapted to output data or a signal representative of the motoring current in said phase, said current sensing circuit comprising a first amplifier having a gain and being adapted for processing motoring phase currents, and a second amplifier having a gain, said second amplifier being adapted for processing sensing pulse currents, and said gain of said second amplifier being ten or more times larger than said gain of said first amplifier; and
    computing device operatively connected to said current sensing circuit.

12. The apparatus for indirect position estimation in three-phase switched reluctance machines of claim 11 wherein, said computing device is adapted to access data regarding a low threshold; said computing device is adapted to access data regarding a high threshold; and said computing device is adapted to determine the sector of the rotor based upon a comparison of the maximum amperage amplitude of the induced pulse current with the low threshold and the high threshold.

13. The apparatus for indirect position estimation in three-phase switched reluctance machines of claim 12 wherein said computing device comprises a signal interface.

14. The apparatus for indirect position estimation in three-phase switched reluctance machines of claim 13 wherein said signal interface is operably engaged to an interface circuit.

* * * * *